(12) United States Patent
Villapakkam et al.

(10) Patent No.: US 11,418,331 B1
(45) Date of Patent: Aug. 16, 2022

(54) IMPORTING CRYPTOGRAPHIC KEYS INTO KEY VAULTS

(71) Applicant: EMC IP Holding Company LLC, Hopkinton, MA (US)

(72) Inventors: Sridhar Villapakkam, Grafton, MA (US); Ajit Bhagwat, Lexington, MA (US)

(73) Assignee: EMC IP Holding Company LLC, Hopkinton, MA (US)

(*) Notice: Subject to any disclaimer, the term of this patent is extended or adjusted under 35 U.S.C. 154(b) by 65 days.

(21) Appl. No.: 17/185,474

(22) Filed: Feb. 25, 2021

(51) Int. Cl.
  *H04L 9/00* (2022.01)
  *H04L 9/08* (2006.01)

(52) U.S. Cl.
  CPC .................. *H04L 9/0861* (2013.01)

(58) Field of Classification Search
  CPC .................................................. H04L 9/0861
  See application file for complete search history.

(56) References Cited

U.S. PATENT DOCUMENTS

| | | | |
|---|---|---|---|
| 5,594,899 A | 1/1997 | Knudsen et al. | |
| 7,502,467 B2 | 3/2009 | Brainard | |
| 8,059,814 B1 | 11/2011 | Duane | |
| 8,379,857 B1 | 2/2013 | Zheng | |
| 8,566,952 B1 | 10/2013 | Michaels | |
| 8,588,425 B1 * | 11/2013 | Harwood | G06F 12/1408 380/278 |
| 8,645,681 B1 | 2/2014 | D'Souza | |
| 9,594,918 B1 * | 3/2017 | Robinson | G06F 21/6209 |
| 2003/0037237 A1 | 2/2003 | Abgrall et al. | |
| 2005/0278527 A1 | 12/2005 | Liao et al. | |
| 2006/0291664 A1 | 12/2006 | Suarez et al. | |
| 2009/0034733 A1 | 2/2009 | Raman et al. | |
| 2011/0246765 A1 * | 10/2011 | Schibuk | H04L 63/102 713/158 |
| 2012/0117341 A1 | 5/2012 | Amit et al. | |
| 2012/0266209 A1 | 10/2012 | Gooding et al. | |

(Continued)

FOREIGN PATENT DOCUMENTS

| | | | | |
|---|---|---|---|---|
| GB | 2580709 A * | 7/2020 | | G06F 21/51 |
| WO | WO-2014058640 A1 * | 4/2014 | | G06F 21/41 |

OTHER PUBLICATIONS

Dell EMC, "Dell EMC Unity: Cloud Tiering Appliance (CTA) A Detailed Review," White Paper, Jul. 2017, 24 pages.

(Continued)

*Primary Examiner* — Darshan I Dhruv
(74) *Attorney, Agent, or Firm* — Ryan, Mason & Lewis, LLP

(57) ABSTRACT

Techniques are provided to import a cryptographic key into a key vault in which an application programming interface for the key vault does not support importing existing cryptographic keys into the key vault. A key management system obtains a cryptographic key from a first key vault. The cryptographic key includes a key value and attributes which describe the cryptographic key. The key management system imports the cryptographic key into a second key vault by generating a surrogate key in the second key vault which corresponds to the cryptographic key. The surrogate key includes a key attribute having a value which corresponds to the key value of the cryptographic key.

20 Claims, 6 Drawing Sheets

(56) References Cited

U.S. PATENT DOCUMENTS

| | | | |
|---|---|---|---|
| 2014/0019753 A1* | 1/2014 | Lowry | H04L 9/0894 |
| | | | 713/155 |
| 2017/0223003 A1* | 8/2017 | Miles | G06F 21/6254 |
| 2017/0324550 A1* | 11/2017 | Yuan | H04L 9/0822 |
| 2020/0136822 A1 | 4/2020 | Viiiapakkam et al. | |
| 2021/0036851 A1 | 2/2021 | Villapakkam et al. | |
| 2021/0303720 A1* | 9/2021 | Creenaune | H04L 63/0428 |
| 2022/0131686 A1* | 4/2022 | Chhodavdia | H04L 9/0877 |

OTHER PUBLICATIONS

Dell Technologies, "Dell EMC Unity: Cloud Tiering Appliance (CTA) A Detailed Review," White Paper, Jun. 2020, 43 pages.

* cited by examiner

200

IMPORTING CRYPTOGRAPHIC KEYS INTO KEY VAULTS

FIELD

This disclosure relates generally to cryptographic key management techniques and, in particular, to cryptographic key management techniques for distributed storage systems and cloud computing systems.

BACKGROUND

Currently, cloud computing services are provided globally to millions of users and customers who reside in different geolocations (e.g., countries, continents, etc.). Various entities provide private or public cloud computing services globally to different customers over various sectors for critical and non-critical applications. These entities provide various cloud computing services including, for example, Software-as-a-Service (SaaS), Infrastructure-as-a-Service (IaaS), and/or Platform-as-a-Service (PaaS). Cloud computing services are commonly used for storing user data "in the cloud." For example, users may subscribe to a service over a communications network which stores the users' data in a widely-distributed storage system. This approach is advantageous in that it allows users to access their data from any location and using different devices, while also providing protection against catastrophic loss of data at any one physical location.

To preserve user privacy and protect against unauthorized access and use of stored cloud data, a cloud computing service typically implements a data encryption system to encrypt the user data and store the user data in encrypted form. To support encryption services in the cloud, key management servers are typically implemented to create, store and manage cryptographic keys that are used for encrypting and decrypting data. As hundreds or thousands or more users typically store data within the same distributed storage system managed by a cloud service, the key management servers must generate and maintain different cryptographic keys for the different users (or possibly several cryptographic keys per user).

SUMMARY

Exemplary embodiments of the disclosure include techniques for importing cryptographic keys into a key vault in which an application programming interface (API) for the key vault does not support importing existing cryptographic keys into the key vault. For example, in one exemplary embodiment, a key management system obtains a cryptographic key from a first key vault. The cryptographic key comprises a key value and attributes which describe the cryptographic key. The key management system imports the cryptographic key into a second key vault by generating a surrogate key in the second key vault which corresponds to the cryptographic key. The surrogate key comprises a key attribute having a value which corresponds to the key value of the cryptographic key.

Other embodiments of the disclosure include, without limitation, computing systems and articles of manufacture comprising processor-readable storage media for implementing a cryptographic key management system.

DETAILED DESCRIPTION

Figure 1:
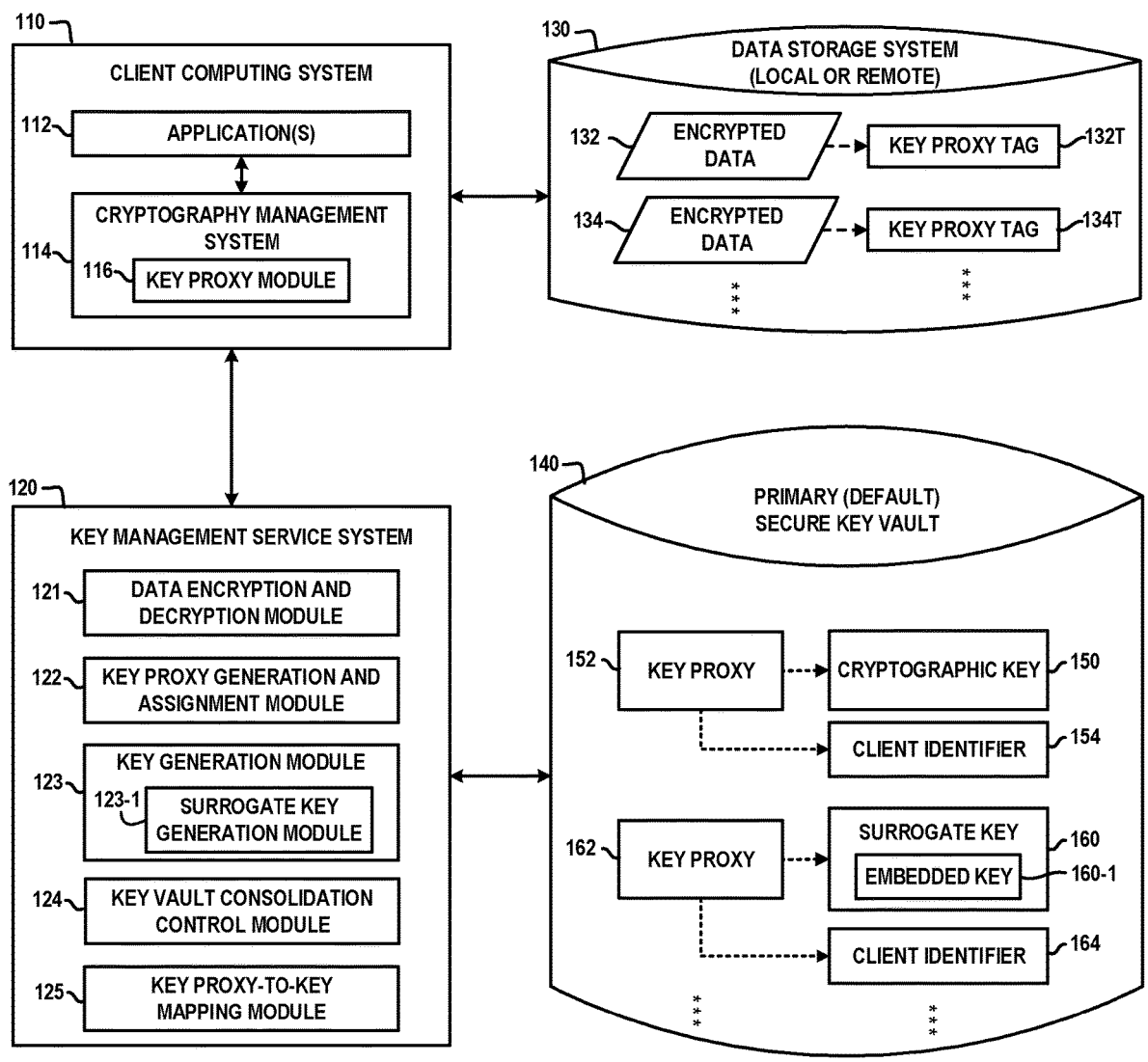
FIG. 1 is a high-level schematic illustration of a system which implements a cryptographic key management system according to an exemplary embodiment of the disclosure.

Exemplary embodiments of the disclosure will now be described in further detail with regard to systems and methods to implement a cryptographic key management system which is configured to import cryptographic keys into key vaults and to merge key vaults. The exemplary systems and methods for importing keys and merging key vaults as disclosed herein allow a cryptographic key management system to consolidate multiple key vaults with different underlying vault APIs in systems where an underlying vault interface for a given key vault does not support adding previously created cryptographic keys in the given key vault.

In some systems, a cryptographic key management system will manage a plurality of different key vaults with different technologies and application programming interfaces (APIs), and maintain a global mapping which maps cryptographic keys to the different key vaults, wherein such mapping is utilized by the cryptographic key management system to determine which key vault hosts a given cryptographic key. This approach requires the cryptographic key management system to maintain and manage multiple key vaults and corresponding APIs, which can be problematic for various reasons. For example, when accessing a target cryptographic key in response to a client request, the cryptographic key management system must determine which key vault contains the target cryptographic key, which can result in performance latency.

Moreover, since cryptographic key technologies and associated key vault APIs can be updated or changed on a regular basis, the cryptographic key management system must be regularly updated to be compatible with the new or updated APIs for the key vaults so that the cryptographic key management system can properly utilize the API to access the given key vault. This becomes increasingly problematic when the cryptographic key management system maintains a relatively large number of different key vaults (e.g., tens to hundreds of vaults), as the cryptographic key management system must be updated each time the API for a given key vault is updated or otherwise modified, which results in performance latency. Furthermore, the cryptographic key management system suffers performance latency as a result of having to manage concomitant migrates, backups, restores, etc., of such key vaults. Therefore, due to reasons ranging from changes in key vault technologies, changes in key vault managers, changes in key vault APIs, to client consolidations of computing system and devices, certain techniques for managing multiple key vaults by the cryptographic key management system are undesirable.

When a customer consolidates multiple computing systems and devices in the field, the customer may want to merge the key vaults associated with such computing systems and devices into a single key vault, rather than maintaining different key vaults. Consolidation of multiple key vaults into a single key vault would facilitate key vault management and key access operations. However, consolidation of multiple key vaults into a given key vault is only an option when the API for the given key vault provides support to import or add existing cryptographic keys into the given key vault, and embedded key vault interfaces usually lack such provision. In other cases, it may not be possible to add an existing key into a given key vault due to reasons of mismatch in key length, etc. In this regard, merging key vaults into a single key vault is not possible when the API does not provide means to import existing keys from one vault into another vault. In other words, the API of a given key vault does not allow an already created and existing key to be added into the given key vault.

Exemplary embodiments of the disclosure provide techniques for adding existing cryptographic keys from one or more source key vaults into a destination key vault in instances where the underlying key vault API interface for the destination key vault does not support the merging of different key vaults into the destination key vault by adding/importing existing cryptographic keys from other key vaults into the destination key vault. As explained in further detail below, exemplary embodiments of the disclosure implement systems and methods for creating and managing "surrogate keys" in which a given cryptographic key hosted in a source key vault can be added into a destination key vault by creating a new cryptographic key in the destination vault and designating the newly created key as a surrogate key which is configured to host or embed the given cryptographic key which is provided from the source key vault.

FIG. 1 is a high-level schematic illustration of a system 100 which implements a cryptographic key management system according to an exemplary embodiment of the disclosure. The system 100 comprises a client computing system 110, a key management service system 120 (alternately referred to herein as key management system), a data storage system 130, and a secure key vault 140. The client computing system 110 comprises one or more applications 112, and a cryptography management system 114, which execute on the client computing system 110. The cryptography management system 114 comprises a key proxy module 116. The key management system 120 comprises a system of software modules, wherein the software modules comprise a data encryption and decryption module 121, a key proxy generation and assignment module 122, a key generation module 123 (which comprises a surrogate key generation module 123-1), a key vault consolidation control module 124, and a key proxy-to-cryptographic key mapping module 125 (alternatively referred to herein as "mapping module").

The client computing system 110 may comprise one of various types of computing systems or devices such as a desktop computer, a laptop computer, a workstation, a computer server, an enterprise server, a rack server, a smart phone, an electronic tablet, etc. The key management system 120 executes on a computing system such as a desktop computer, a laptop computer, a workstation, a computer server, an enterprise server, a rack server, etc. In some embodiments, the key management system 120 executes on a computing system which is separate and remote from the client computing system 110, and in some embodiments, the key management system 120 executes on the client computing system 110.

The applications 112 which execute on the client computing system 110 include one or more of various types of applications including, but not limited to, end-user applications, data storage applications, operating systems, storage servers, file systems, database applications, etc., or other types of applications which store and access data (e.g., encrypted data) to and from the data storage system 130. In some embodiments, the data storage system 130 comprises a local data storage system (i.e., locally resides with the client computing system 110) which comprises one or more different types of persistent storage devices, or data storage arrays, such as hard disk drives (HDDs), solid-state drives (SSDs), or other types and combinations of persistent storage systems implemented using, e.g., direct attached storage (DAS) systems, etc. In some embodiments, the data storage system 130 comprises a remote data storage system, e.g., cloud-based distributed storage system, network attached storage (NAS), a storage area network (SAN) system, etc., which is remotely accessible by the client computing system 110 over a storage and/or communications network. In some embodiments, the data storage system 130 can be an enterprise-class storage platform comprising high-performance, scalable storage arrays, for use with hyper-scale computing systems.

The cryptography management system 114 comprises a client application (e.g., an API) which securely communicates with the key management system 120 to perform various functions as described herein. For example, the key proxy module 116 implements methods that are configured to support the creation and assignment of key proxies for the client computing system 110 and/or the applications 112 that execute on the client computing system 110. In addition, the cryptography management system 114 implements methods that are configured to securely communicate with the key management system 120 to access data encryption and data decryption services provided by the key management system 120 on behalf of the applications 112. As explained below, the cryptography management system 114 is configured to establish a secure communications channel with the key management system 120 and pass cryptographic requests (e.g., data encryption requests or data decryption requests) received from the applications 112, along with key proxy information and plaintext data or encrypted data, to the key management system 120.

The key management system 120 implements methods that are configured to administer the full lifecycle of cryptographic keys that are used for encrypting and decrypting data of the client applications 112, and to protect the cryptographic keys from loss or unauthorized or malicious use. The key management system 120 securely maintains cryptographic keys in the secure key vault 140. The secure key vault 140 may reside in a local persistent storage that is directly connected to the computing system (e.g., server node) which hosts the key management system 120, or reside in a remote persistent storage of a remote key storage server that is network connected to the computing system which hosts the key management system 120.

It is to be understood that for ease of illustration, FIG. 1 depicts a single secure key vault 140, although at any given point in time, the key management system 120 can be managing a plurality of different secure key vaults including the secure key vault 140 of FIG. 1. In some embodiments, the secure key vault 140 in FIG. 1 represents a primary (default) secure key vault with a corresponding API and vault technology that the key management system 120 is actively utilizing and maintaining, while the key management system 120 performs various operations (e.g., key import and vault consolidate/merge operations) to merge the other key vaults into the primary (default) key vault 140 for the purpose of, e.g., managing and single key vault and associated API, to thereby enhance the performance of the key management system 120.

The key management system 120 implements various methods to support encryption/decryption services and for generating and managing cryptographic keys as follows. For example, the data encryption and decryption module 121 implements methods for encrypting data (e.g., translating plaintext data into ciphertext) and decrypting data (e.g., converting ciphertext back to plaintext). The data encryption and decryption module 121 can implement one or more of various types of cryptographic techniques. For example, in some embodiments, the data encryption and decryption module 121 implements a symmetric key cryptography system, wherein the same cryptographic key is utilized to both encrypt and decrypt the data. The cryptographic keys for the client applications 112 are securely maintained in the secure key vault 140, and retrieved and utilized by the key management system 120 to provide data encryption and decryption services to the client applications 112.

The key proxy generation and assignment module 122 implements methods that are configured to generate key proxies and assign key proxies to the client applications 112. In some embodiments, a key proxy is an algorithmically generated tag or identifier which is assigned to a given client application or client device, and which serves to uniquely identify a set of one or more cryptographic keys which are associated with the given client application or client device. In some embodiments, a key proxy is created in such a manner that it does not look like a standard cryptographic key. A key proxy is decorated differently than a typical cryptographic key (e.g., different headers, different mathematical characteristics, etc.) so that a hacker searching, e.g., the client computing system 110 or the data storage system 130 for cryptographic keys will be unlikely to find or identify a key proxy.

The key proxies for the client applications 112 are passed between the client cryptography management system 114 and the key management system 120, and are used by the key management system 120 to identify the cryptographic keys to be used for encrypting/decrypting data provided by the client applications 112. A key proxy essentially serves as a proxy in place of a cryptographic key such that the actual cryptographic keys associated with the key proxy remain stored in the secure key vault 140 and never passed to the client applications 112. In this regard, a key proxy is not used to encrypt or decrypt data, but rather a key proxy is utilized as a means for the key management system 120 to uniquely identify a set of one or more cryptographic keys which are associated with a given client application. As such, the use of key proxies abstracts the client applications 112 from knowledge of the actual cryptographic keys that are generated and utilized by the key management system 120 for providing cryptographic services to the client applications 112. In some embodiments, the key management system 120 implements key proxy assignment and management techniques as disclosed in U.S. patent application Ser. No. 16/175,356, filed on Oct. 30, 2018, entitled "Secure Distributed Storage of Encryption Keys," which is commonly owned with the present application, and incorporated herein by reference.

The key generation module 123 implements methods that are configured to generate cryptographic keys, as well as perform other functions such as deleting, archiving, and revoking cryptographic keys, etc. For example, in some embodiments, the key generation module 123 implements symmetric cryptographic key generation techniques for algorithmically generating symmetric cryptographic keys (e.g., data encryption keys) using a cryptographically secure random bit generator which generates symmetric cryptographic keys that are unique and unpredictable. By way of example, in some embodiments, symmetric data encryption keys are generated using a 256-bit AES (Advanced Encryption Standard) algorithm. As is known in the art, 256-bit AES is an encryption standard that utilizes block ciphers e.g., AES-128, AES-192 and AES-256, to encrypt and decrypt data in blocks of 128 bits using cryptographic keys of size 128-bits, 192-bits and 256-bits, respectively.

In some embodiments, the key generation module 123 utilizes an API for a given key technology to create cryptographic keys, wherein a cryptographic key comprises a key value which is generated using techniques as discussed above, as well as a set of attributes which are specified by the given API and which describe the cryptographic key. In some embodiments, the set of key attributes for a given cryptographic key are stored in an attributes object, which contain all of the attributes associated with the cryptographic key. The attributes object is used to query key attributes of the cryptographic key. The key attributes include, for example, key value type and size attributes, a key identifier (alias) attribute (which an application uses to refer to the key), time stamp attributes such as a key creation time attribute and a key activation time attribute, a lifetime attribute which determines when the key expires, a policy which determines how the key can be utilized, and other relevant attributes which may be mandated by the key API. In addition, the given key API provides a provision to generate custom attributes which are used to tag additional information to the cryptographic key, as may be desired for a given application. As explained in further detail below, the cryptographic keys and associated attributes (e.g., name, activation date, size, etc.) are stored in the secure key vault 140 in association with key proxies.

In some embodiments, the key generation module 123 implements methods that are configured to generate key cryptographic keys that are used for encrypting and decrypting the cryptographic keys that are stored in the secure key vault 140. In such embodiments, the cryptographic keys can be stored in the secure key vault 140 in encrypted form so that the secure key vault 140 is protected even if a rogue actor is able to access the secure key vault 140 (e.g., by stealing a persistent storage device which comprises the secure key vault 140).

The key generation module 123 implements various modules for generating cryptographic keys and managing the lifecycle of such cryptographic keys via, e.g., key rotation, key deletion, etc. A key rotation process generally involves generating a new version of an existing cryptographic key upon the occurrence of a predetermined event that mandates the rotation of the cryptographic key associated with a given client application and corresponding key proxy. The key rotation process results in the creation of a new cryptographic key which is deemed a primary cryptographic key that is utilized to encrypt new data. The key generation module 123 can be configured to rotate cryptographic keys in response to one or more different types of predefined key rotation events, which can vary depending on various factors with regard to security concerns and practices. For example, in some embodiments, a key rotation event is based on a predefined "regular rotation" schedule in which a cryptographic key for a given key proxy is changed periodically (e.g., after the lapse of a certain time interval such as days, months, years, etc.) to fulfill a key rotation mandate or a key expiration strategy or for other reasons. In other embodiments, a key rotation event is based on an irregular, or ad-hoc rotation mandate, wherein key rotation can be performed by an administrator on demand when one or more cryptographic keys have been compromised or believed to have been compromised, etc. In addition, the key generation module 123 can be configured to control the revocation of keys, the deletion of keys, the mirroring of keys to a failover system, changing the attributes of the cryptographic keys, etc. A cryptographic key for a given key proxy which is no longer being used to support encryption and decryption requests, or which has been compromised, can be deleted from the secure key vault 140.

The surrogate key generation module 123-1 is configured to generate surrogate keys that are maintained in the primary secure key vault 140. More specifically, the surrogate key generation module 123-1 implements methods that enable the key management system 120 to import a cryptographic key from a source key vault into the primary secure key vault 140 by generating and storing a surrogate key in the primary secure key vault 140 which corresponds to the imported cryptographic key. The surrogate key is effectively configured as a host key which hosts an existing cryptographic key that is imported into the primary key vault 140, wherein the surrogate key comprises a custom created attribute, referred to herein as "embedded-key attribute" or "key attribute" which has an attribute value which corresponds to the key value of the cryptographic key (e.g., the actual key value, an encrypted version of the actual key value).

The surrogate key generation module 123-1 implements a surrogate key generation process which includes, e.g., (i) creating a new cryptographic key in the primary key vault 140 using an API associated with the key vault 140, wherein the new cryptographic key comprises attributes which are specified by the API, (ii) designating the new cryptographic key as the surrogate key which comprises the attributes specified by the API, (iii) setting values of the attributes of the surrogate key equal to values of corresponding attributes of the imported cryptographic key, and (iv) creating a custom "key attribute" or "embedded-key attribute" using the API of the second key vault, and setting a value of the custom "key attribute" to a value which corresponds to the key value of the imported cryptographic key. An exemplary surrogate key generation process will be discussed in further detail below in conjunction with the exemplary flow diagram of FIG. 4.

As a result of the surrogate key generation process, the surrogate key (or hosting key) becomes a host for the imported cryptographic key and its associated key proxy, wherein the imported cryptographic key (or the hosted key) becomes an embedded key in the surrogate key. Once the surrogate key is generated with the associated attributes, the surrogate key will be compatible with the API of the key vault 140. Based on a related concept of polymorphism, the custom key attributes provided by the API of the key vault 140 allow an existing cryptographic key from another key vault to be "morphed" into surrogate key that is stored in the key vault 140 and accessible by the API of the key vault. An advantage of employing a surrogate key generation process to import a cryptographic key is that the key management system 120 can maintain a single key vault 140 with cryptographic keys from other key vaults regardless of whether the original keys were from different homogeneous or heterogeneous key vaults, i.e., with disparate key technologies, management interfaces, etc.

The key vault consolidation control module 124 controls offline operations for merging key vaults during times of routine maintenance, or software updates of the key management system 120 or a key vault API, etc. The key vault consolidation control module 124 utilizes the surrogate key generation module 123-1 to create surrogate keys for cryptographic keys in a source key vault, and store the surrogate keys in the primary key vault 140 managed by key management system 120.

The key proxy-to-cryptographic key mapping module 125 (alternatively "mapping module") implements methods that are configured to generate and maintain a mapping or otherwise associate key proxies to cryptographic keys including surrogate keys. When objects are encrypted by the data encryption and decryption module 121, the encrypted data is associated with a key proxy tag. When the encrypted data of a given client application needs to be decrypted, the key management system 120 utilizes the key proxy tag associated with the encrypted data to determine the cryptographic key that was used to encrypt the data, and then accesses such cryptographic key from the secure key vault 140 to decrypt the encrypted data. When the key management system 120 maintains and accesses multiple key vaults (prior to consolidation of such key vaults into the primary key value 140), the key proxy-to-cryptographic key mapping module 125 can be utilized by the key management system 120 to determine which key vault, among a plurality of key vaults (including the primary key vault 140 and one or more additional key vaults), hosts a cryptographic key associated with the a given key proxy.

As shown in FIG. 1, the data storage system 130 stores encrypted data 132 and 134 of the client applications 112. The encrypted data 132 and 134 can be, for example, encrypted files, encrypted objects, encrypted data blocks, etc., which are utilized or otherwise managed by the client applications 112. In the exemplary embodiment shown in FIG. 1, the encrypted data 132 is associated with a key proxy tag 132T which identifies the key proxy assigned to the client application which owns or utilizes the encrypted data 132. Similarly, the encrypted data 134 is associated with a key proxy tag 134T which identifies the key proxy assigned to the client application which owns or utilizes the encrypted data 134. While only several instances of encrypted data 132 and 134 and associated tags 132T and 134T are shown in the data storage system 130 in FIG. 1 for ease of illustration, it is to be understood that the data storage system 130 would have multiple instances of encrypted data (and associated tags) for the same client application and/or other client applications.

Various techniques can be utilized to store the key proxy tags 132T and 134T in association with the encrypted data 132 and 134. For example, the key proxy tags 132T and 134T can be recorded as part of the metadata of the encrypted data 132 and 134, respectively. For example, the key proxy tags 132T and 134T can be recorded within inodes (index nodes) of files containing the encrypted data 132 and 134. As is known in the art, an inode is a data structure that describes a file system object (e.g., file), wherein the inode stores attributes, metadata, and the disk block location(s) of the data associated with the object. In other embodiments, references to the key proxy tags 132T and 134T can be stored in a table that maps to one or more regions of disk storage where the encrypted data 132 and 134 are stored.

When data (e.g., object, file, etc.) is encrypted by the data encryption and decryption module 121 of the key management system 120, the data is associated with a key proxy which, in turn, is associated with the cryptographic key used to encrypt the data. When the encrypted data is subsequently provided to the key management system 120 for decryption, the key management system 120 will utilize the associated key proxy provided by the client application to retrieve the corresponding cryptographic key from the secure key vault 140 which is to be used for decrypting the encrypted data.

For example, as shown in FIG. 1, the secure primary key vault 140 stores multiple cryptographic keys (e.g., cryptographic key 150), and/or surrogate keys (e.g., surrogate key 160) and associated key proxy information. For example, the cryptographic key 150 is associated with a given key proxy 152 assigned to a given one of the client applications 112, and the surrogate key 160 is associated with a given key proxy 162 assigned to a given one of the client applications 112. In some embodiments, the key proxies 152 and 162 comprise key attributes of the respective keys 150 and 160. The surrogate key 160 comprises an embedded key value 160-1, which represents the key value (e.g., actual key value, or encrypted key value) of a cryptographic key that is imported from another key vault and hosted by the surrogate key 160. In some embodiments, the embedded key 160-1 comprises a custom attribute (custom key attribute, or custom embedded-key attribute) which is created during a surrogate key generation process and set to a key value or encrypted key value of the imported cryptographic key. The key proxy tags 132T and 134T in the data storage system 140 map to key proxies in the secure key vault, and such mapping is utilized to identify and retrieve a cryptographic key or surrogate key when needed by the key management system 120 to perform functions such as cryptographic processing of data (e.g., encrypting or decrypting data).

In some embodiments, the key proxies are mapped or otherwise associated with respective client identifiers, wherein the client identifiers comprise known valid credentials of one or more of the client computing system 110, the client applications 112 and/or the client cryptography management system 114, which are deemed to be properly associated with the key proxies. For example, as shown in FIG. 1, a client identifier 154 is mapped to the key proxy 152, and a client identifier 164 is mapped to the key proxy 162. When the key management system 120 accesses the secure key vault 140 to obtain the cryptographic key 150 associated with the key proxy 152, the key management system 120 can compare credentials received by a requesting client application or device against the client identifier 154 to determine if the credentials match or otherwise correspond to the client identifier 154. Similarly, when the key management system 120 accesses the secure key vault 140 to obtain the surrogate key 160 associated with the key proxy 162, the key management system 120 can compare credentials received by a requesting client application or device against the client identifier 164 to determine if the credentials match or otherwise correspond to the client identifier 164.

In some embodiments, the cryptographic key 150 and surrogate key 160 are stored in the secure key vault 140 in encrypted form so that the secure key vault 140 is protected even if a rogue actor is able to access the secure key vault 140 (e.g., by stealing the persistent storage device on which the secure key vault 140 is stored). In some embodiments, the key proxies and/or client identifiers are stored in the secure key vault 140, either in encrypted or plaintext format. In other embodiments, one or both of the key proxies 152 and 162 and/or client identifiers 154 and 164 are not directly stored in the secure key vault 140. Instead, the associations are encoded by choosing a key with which to encode the stored keys 150 and 160 such that the encoded cryptographic key for a particular key is derivable from the associated key proxy and/or the client identifier. In some embodiments, multiple client identifiers may be associated with a given key proxy such that different client devices and/or client applications may have their data encrypted using the same cryptographic key(s) associated with the given key proxy.

Figure 2:
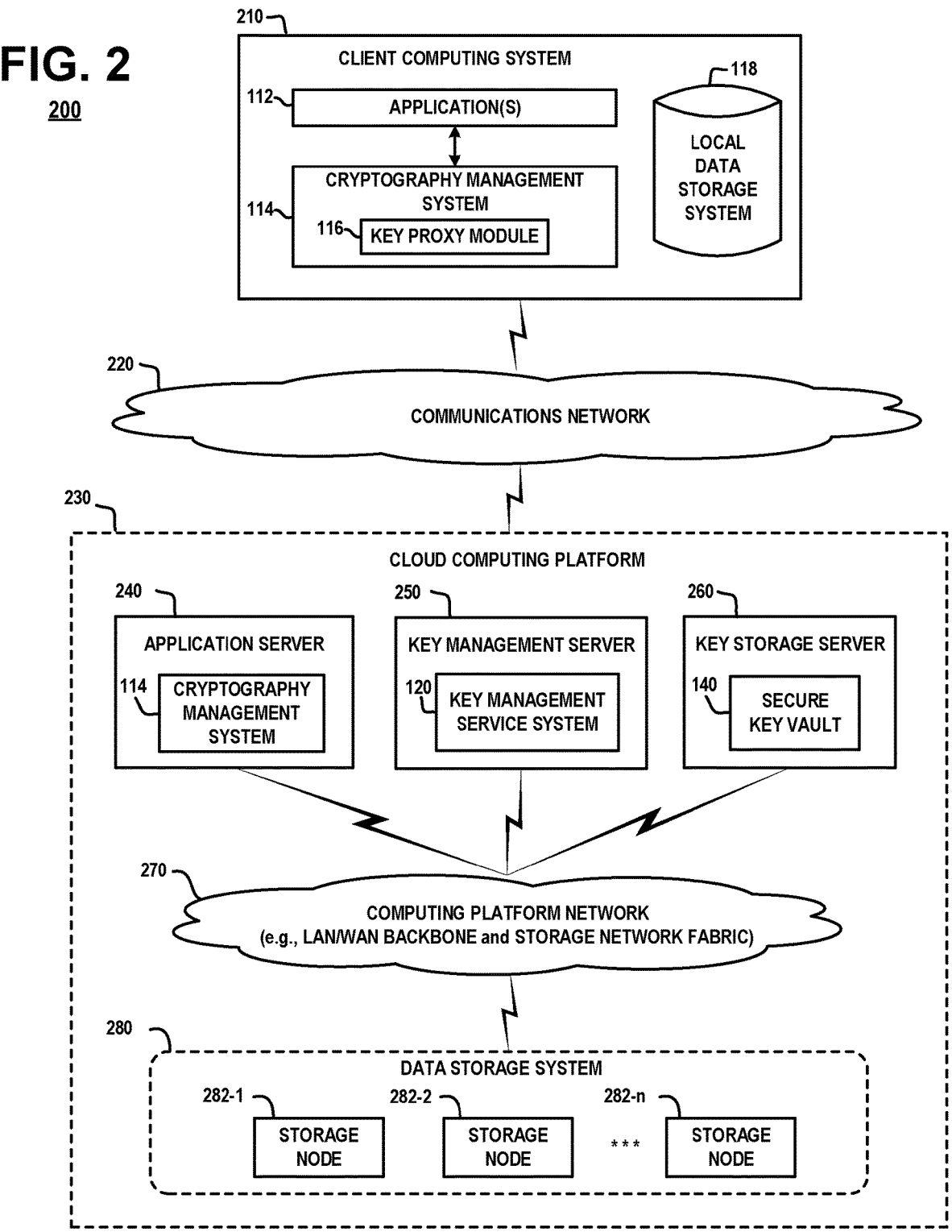
FIG. 2 is a high-level schematic illustration of a cloud computing system which implements a cryptographic key management system according to an exemplary embodiment of the disclosure.

FIG. 2 is a high-level schematic illustration of a cloud computing system 200 which implements a cryptographic key management system according to an exemplary embodiment of the disclosure. In particular, FIG. 2 illustrates an exemplary embodiment of the system of FIG. 1 implemented in the context of a cloud computing system and/or a distributed storage system. The system 200 comprises a client computing system 210, a communications network 220, and a cloud computing platform 230. Similar to the client computing system 110 of FIG. 1, the client computing system 210 comprises one or more applications 112, and a cryptography management system 114 which comprises a key proxy module 116. In addition, the client computing system 210 comprises a local data storage system 118 (e.g., HDD, SSD, etc.).

The cloud computing platform 230 is accessible by the client computing system 210 over the communications network 220. While the communications network 220 is generically depicted in FIG. 2, it is to be understood that the communications network 220 may comprise any known communication network such as, a global computer network (e.g., the Internet), a wide area network (WAN), a local area network (LAN), a satellite network, a telephone or cable network, a cellular network, a wireless network such as Wi-Fi or WiMAX, or various portions or combinations of these and other types of networks. The term "network" as used herein is therefore intended to be broadly construed so as to encompass a wide variety of different network arrangements, including combinations of multiple networks possibly of different types. In this regard, in some embodiments, the communications network 220 comprises combinations of multiple different types of communications networks each comprising network devices configured to communicate using Internet Protocol (IP) or other related communication protocols. The communications network 220 comprises intermediate points (such as routers, switches, etc.) and other elements (e.g., gateways) that form a network backbone to establish communication paths and enable communication between network endpoints.

The cloud computing platform 230 comprises at least one application server 240, a key management server 250, a key storage server 260, a computing platform network 270, and a distributed data storage system 280. The application server 240 hosts a cryptography management system 114. The key management server 250 hosts a key management service system 120. The key storage server 260 hosts and maintains a secure key vault 140. The distributed data storage system 280 comprises a plurality of data storage nodes 282-1, 282-2, . . . , 282-n (collectively, data storage nodes 282).

The data storage system 280 can be implemented using any suitable data storage system, or combination of data storage systems, including, but not limited to storage area network (SAN) systems, Hadoop Distributed File System (HDFS), as well as other types of data storage systems comprising clustered or distributed virtual and/or physical infrastructure. In some embodiments, the data storage nodes 282 comprise storage appliances with memory controllers, processors, cache memory, and non-volatile storage media to provide persistent storage resources for the application server 240 and other computing nodes of the cloud computing platform 230. The data storage devices of the data storage nodes 282 may include one or more different types of persistent storage devices, or data storage arrays, such as hard disk drives or solid-state drives, or other types and combinations of non-volatile memory. In one embodiment, the data storage nodes 282 are implemented using, for example, an enterprise-class storage platform comprising high-performance, scalable storage arrays, which can be implemented for hyper-scale computing systems.

The computing platform network 270 is configured to enable peer-to-peer communication between the servers 240, 250, and 260 within the cloud computing platform 230, as well as enable network access by the servers 240, 250, and 260 to the distributed data storage system 280 and peer-to-peer communication between the data storage nodes 282 of the distributed data storage system 280. Depending on the network distribution and geographic location of the constituent components and nodes of the cloud computing platform 230, the computing platform network 270 may comprise, for example, a LAN, a WAN, or a combination of one or more LANs and WANs, as well as other types of communication networks that are commonly used to implement cloud computing systems. In addition, the computing platform network 270 comprises a storage network fabric to enable shared access by the servers 240, 250 and 260 to the data storage system 280 and to enable communication between the storage nodes 282. In some embodiments, the computing platform network 270 comprises a converged framework such as a converged Ethernet framework.

In one embodiment, the cloud computing platform 230 performs data processing, data storage, and data management functions to support one or more network or web-based applications or services and/or other types of high performance computing (HPC) applications such as deep learning applications, machine learning, big data analytics, or other types of HPC applications that are typically implemented using a public cloud-based service system to deliver consumer or business applications and services to multiple end users, service providers, and/or organizations. In other embodiments, the cloud computing platform 230 comprises a private cloud platform that is accessible by a single organization, for example. The application server 240 is configured to host and manage one or more applications, which are used by multiple, simultaneously connected users and/or entities in one or more application domains. Depending on the implementation of the cloud computing platform 230, the application server 240 is configured to, e.g., execute business logic, execute scripts and services to query databases, and perform other computing functions that are needed to deliver the cloud-based applications and services provided by the cloud computing platform 230. In some embodiments, the servers 240, 250 and 260 and the constituent system components of the cloud computing platform 230 are implemented using (i) a cluster of servers that reside in a single facility (e.g., data center facility of private company) or (ii) a cluster of servers that reside in two or more data center facilities or remote locations (distributed over a cloud network) of a given service provider, for example.

In some embodiments, the cryptographic management system 114 that executes on the client computing system 210 and the application server 240 implements the same or similar functions as discussed above in conjunction with FIG. 1, the details of which will not be repeated. The cryptography management system 114 which executes on the client computing system 210 is configured to securely communicate with the key management system 120 (hosted by the key management server 250) to access data encryption and data decryption services provided by the key management system 120 on behalf of the local applications 112 that execute on the client computing system 210. The applications 112 on the client computing system 210 can store data "locally" in the local data storage system 118 and/or "in the cloud" in the data storage system 280 of the cloud computing platform. On the other hand, the cryptography management system 114 which executes on the application server 240 is configured to securely communicate with the key management system 120 (hosted by the key management server 250) to access data encryption and data decryption services provided by the key management system 120 on behalf of the applications that are hosted by the application server 240 and other compute nodes of the cloud computing platform 230. The key management server 250 comprises a key management service system 120 which implements the same or similar functions as discussed above in conjunction with FIG. 1, the details of which will not be repeated. The key storage server 260 comprises a secure key vault 140 which implements the same or similar functions as discussed above in conjunction with FIG. 1, the details of which will not be repeated.

Figure 3:
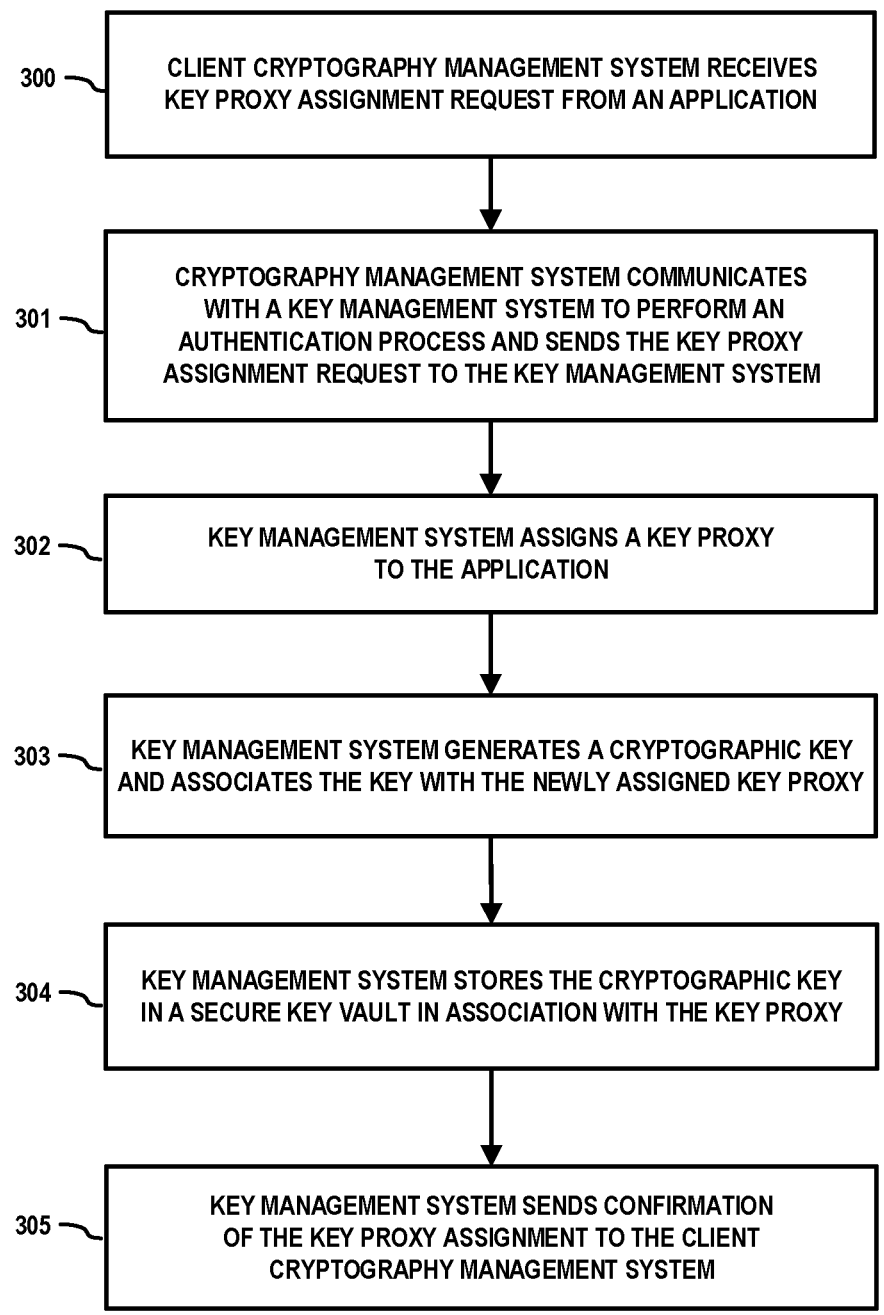
FIG. 3 is a flow diagram of method for key proxy assignment according to an embodiment of the disclosure.

FIG. 3 is a flow diagram of method for key proxy assignment according to an embodiment of the disclosure. In particular, FIG. 3 is a flow diagram of a method for assigning a key proxy and associated cryptographic key to a client. For illustrative purposes, the process flow of FIG. 3 will be discussed in conjunction with the exemplary embodiments of FIGS. 1 and 2. Referring to FIG. 3, a client cryptography management system 114 receives a key proxy assignment request from a given application executing on, e.g., a client device or application server (block 300). In some embodiments, the key proxy assignment can be requested by the application during an initial registration process wherein the application registers with the client cryptography management system 114 to obtain data encryption/decryption management services. In other embodiments, the key proxy assignment can be requested by the application when the application requires data encryption/decryption services for the first time subsequent to the initial registration process. In response to the key proxy assignment request received from the application, the cryptography management system 114 communicates with a key management system 120 to perform an authentication process and sends the key proxy assignment request to the key management system 120 (block 301). For example, in some embodiments, the authentication process is performed to authenticate credentials of the requesting application, the client cryptography management system 114, and/or the key management system 120. In response to verification of the credentials, a secure communications channel is established between the client cryptography management system 114 and the key management system 120. The client cryptography management system 114 sends the key proxy assignment request to the key management system 120 over the secure communications channel.

More specifically, in some embodiments, an authentication process comprises the client cryptography management system 114 sending credentials to the key management system 120 for verification, wherein the credentials include one or more of (i) credentials of the client computing system, (ii) credentials of the requesting user/application, and/or (iii) credentials of the particular instance of the client cryptography management system 114 running on the client computing system. In addition, the key management system 120 can send its credentials to the client cryptography management system 114 for verification. In some embodiments, sending credentials includes generating a digital signature by signing a known message with a private key that is preassigned to, e.g., the client cryptography management system 114 or the client computing system 110, wherein the key management system 120 can then verify the digital signature using a paired public key that is published for client cryptography management system 114 or the client computing system 110. The authentication process is performed to provide security against spoof attacks that can be perpetrated by a hacker. The authentication process can be performed using any suitable PKI (public key infrastructure) authentication process such as verification of certificates using a CA (certificate authority). Following authentication, a secure channel is established between the client cryptography management system 114 and the key management system 120 using a protocol such as, Transport Layer Security (TLS), Secure Shell (SSH), or similar protocols or known key exchange or key agreement protocols.

In some embodiments, the key proxy module 116 of the client cryptography management system 114 generates a key proxy for the requesting application and sends the pre-generated key proxy to the key management system 120 as part of the key proxy assignment request. In response to the key proxy assignment request, the key management system 120 assigns a key proxy to the application (block 302). In some embodiments, the newly assigned key proxy comprises the pre-generated key proxy included with the key proxy assignment request. In other embodiments, when the client cryptography management system 114 does not generate a key proxy and sends a key proxy assignment request with no key proxy, the key management system 120 generates a new key proxy and assigns the newly generated key proxy to the requesting application via the key proxy generation and assignment module 122 (FIG. 1).

The key management system 120 generates a cryptographic key for the application and associates the cryptographic key with the newly assigned key proxy (block 303). For example, in some embodiments, the newly generated cryptographic key comprises a symmetric cryptographic key to be used for encrypting and decrypting data associated with the requesting application. The key management system 120 stores the generated cryptographic key in a secure key vault in association with the newly assigned key proxy (block 304). In some embodiments, the client credentials (e.g., client identifier 154, FIG. 1), which were received by the key management system 120 and utilized in the authentication process, are also associated with the newly assigned key proxy.

In some embodiments, the key management system 120 stores the cryptographic key in a secure key vault that resides in a local persistent storage of the computing system (e.g., server) which hosts the key management system 120. In other embodiments, the key management system 120 stores the cryptographic key in a remote secure key vault that resides in a remote persistent storage of a remote key storage server. In this instance, the key management system 120 sends the cryptographic key and associated information (e.g., key proxy, client identifier, etc.) to the remote key storage server over a secured communications channel to protect against eavesdropping. In some embodiments, the cryptographic key is encrypted using a key encryption key and stored in the secure key vault (local or remote) in encrypted form. The key encryption key can be generated using, e.g., the associated key proxy and/or client credentials using known techniques.

The key management system 120 sends an assignment confirmation to the client cryptography management system 114 to confirm that a key proxy has been successfully assigned to the requesting application and associated with a cryptographic key (block 305). In embodiments where the key management system 120 generates a key proxy for the requesting application, the assignment confirmation that is sent to the to the client cryptography management system 114 will also include the key proxy assigned to the requesting application. In embodiments wherein the client cryptography management system 114 generates the key proxy, the assignment confirmation from the key management system 120 provides conformation that the pre-generated key proxy has been successfully assigned to the requesting application and associated with a cryptographic key. In some embodiments, the assignment confirmation is sent over the secure communications channel. While the confirmation message provides notification to the client cryptography management system 114 that a cryptographic key has been created and stored in a secure key vault in association with the newly assigned key proxy, as noted above, the key management system 120 does not provide the actual cryptographic key or key value to the client cryptography management system 114.

As noted above, the key management system 120 performs various functions including, but not limited to, generating and managing cryptographic keys, managing the key vault 140, and merging other key vaults into the key vault 140 using surrogate keys to import existing cryptographic keys from the other key vaults into the key vault 140. A surrogate key can be created during run-time operation when the key management system 120 receives a request from a client application to perform a cryptographic service (e.g., data encryption operation, or data decryption operation) and the key management system 120 determines that the key proxy provided by the client application is associated with a cryptographic key which resides in a key vault other than the primary key vault 140. In this instance, the key management system 120 can proceed to generate a surrogate key for the existing cryptographic key to include in the primary key vault 140. In other embodiments, surrogate keys can be generated and stored in the primary key vault 140 during an offline operation that is performed by the key vault consolidation control module 124 when merging one or more key vaults into the primary key vault 140.

Figure 4:
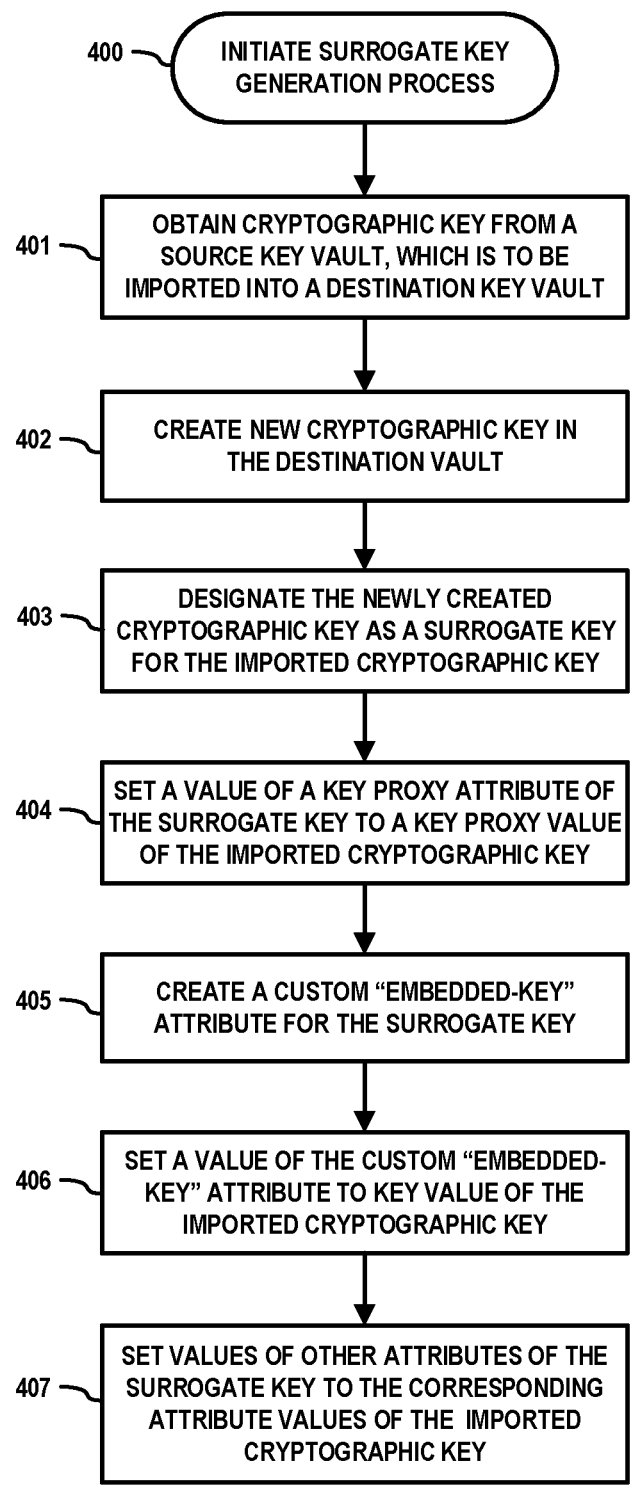
FIG. 4 is a flow diagram of a method for importing a cryptographic key into a key vault according to an exemplary embodiment of the disclosure.

FIG. 4 is a flow diagram of a method for importing a cryptographic key into a key vault according to an exemplary embodiment of the disclosure. In some embodiments, FIG. 4 illustrates an exemplary mode of operation of the surrogate key generation module 123-1 of the key generation module 123 (FIG. 1). The key generation module 123 initiates a surrogate key generation process (block 400) when one or more existing cryptographic keys from one or more source key vaults are to be imported into a destination key vault (e.g., primary key vault 140). The process includes obtaining a cryptographic key from a source key vault, which is to be imported into a destination key vault (block 401) and creating a new cryptographic key in the destination vault (block 402). The newly created cryptographic key is labeled as a surrogate key which corresponds to the imported cryptographic key (block 403). As noted above, a newly created cryptographic key will have a set of attributes (as defined by the key vault API) which describe the newly created cryptographic key and a policy for using the key, as well as a provision for creating custom attributes. The surrogate key generation process proceeds to set values of the attributes of the newly created surrogate key.

For example, the key attributes of the newly created surrogate key will include a "key proxy" attribute, the surrogate key generation process will set the key proxy attribute of the surrogate key equal to the key proxy value of the imported cryptographic key (block 404). As noted above, a custom embedded-key attribute is created to hold a key value, or encrypted key value, of the imported cryptographic key (block 405), and the custom embedded-key attribute of the surrogate key is set to the key value (or encrypted key value) of the imported cryptographic key (block 406). The surrogate key generation process will proceed to set the values of the remaining attributes of the newly created surrogate key with corresponding attribute values of the imported cryptographic key (block 407). Such attributes include, but are not limited to, key alias, expiration date, etc. In this regard, the surrogate key generation process is configured to merge all the information included in the key attributes of the imported cryptographic key into the correcting attributed and custom attributes of the surrogate key to maintain the fidelity of the imported cryptographic key.

The exemplary process of FIG. 4 allows the key management system 120 to import a cryptographic key, which is hosted in a source vault, into a destination vault by creating a new cryptographic key in the destination key vault and designating it a surrogate key. The surrogate key is configured to host or embed the key value of the cryptographic key that is imported from the source key vault. Once the surrogate key has been created to hold the imported cryptographic key as an embedded key along with other required attributes, the key import process is essentially accomplished. The creation of the surrogate key in turn necessitates altering a lookup of a key in the key vault. When the key management system 120 looks up a cryptographic key in the vault using the key proxy, the lookup typically returns the key value of the cryptographic key. On the other hand, when the lookup operation results in locating a surrogate key, the lookup operation returns the custom attribute value of the embedded-key as the key value, as the value of the custom embedded-key attribute is the actual key value of the imported cryptographic key which is hosted by the surrogate key. If the attribute value is an encrypted key value, the key management system 120 will decrypt the attribute value to obtain the actual key value. As another consideration, if the key to be imported is already a surrogate key, key management system 120 simply copies the embedded key value and the embedded key proxy along with other necessary attributes from the existing surrogate key in the source vault to the newly created surrogate key in the destination vault.

This method of creating and utilizing surrogate keys is applicable to many use cases, such as several homogenous vaults or vaults of different heterogenous technologies. The surrogate key generation process also lends itself to consolidation in the face of updates or upgrades to underlying key technologies. Other advantages realized by employing surrogate keys are that vault migration, backups and restores have to contend with just one primary merged vault instead of multiple underlying vaults. The key management system 120 is also unburdened from having to deal with updates to multiple vault technologies and their corresponding interface or management layers.

Figure 5:
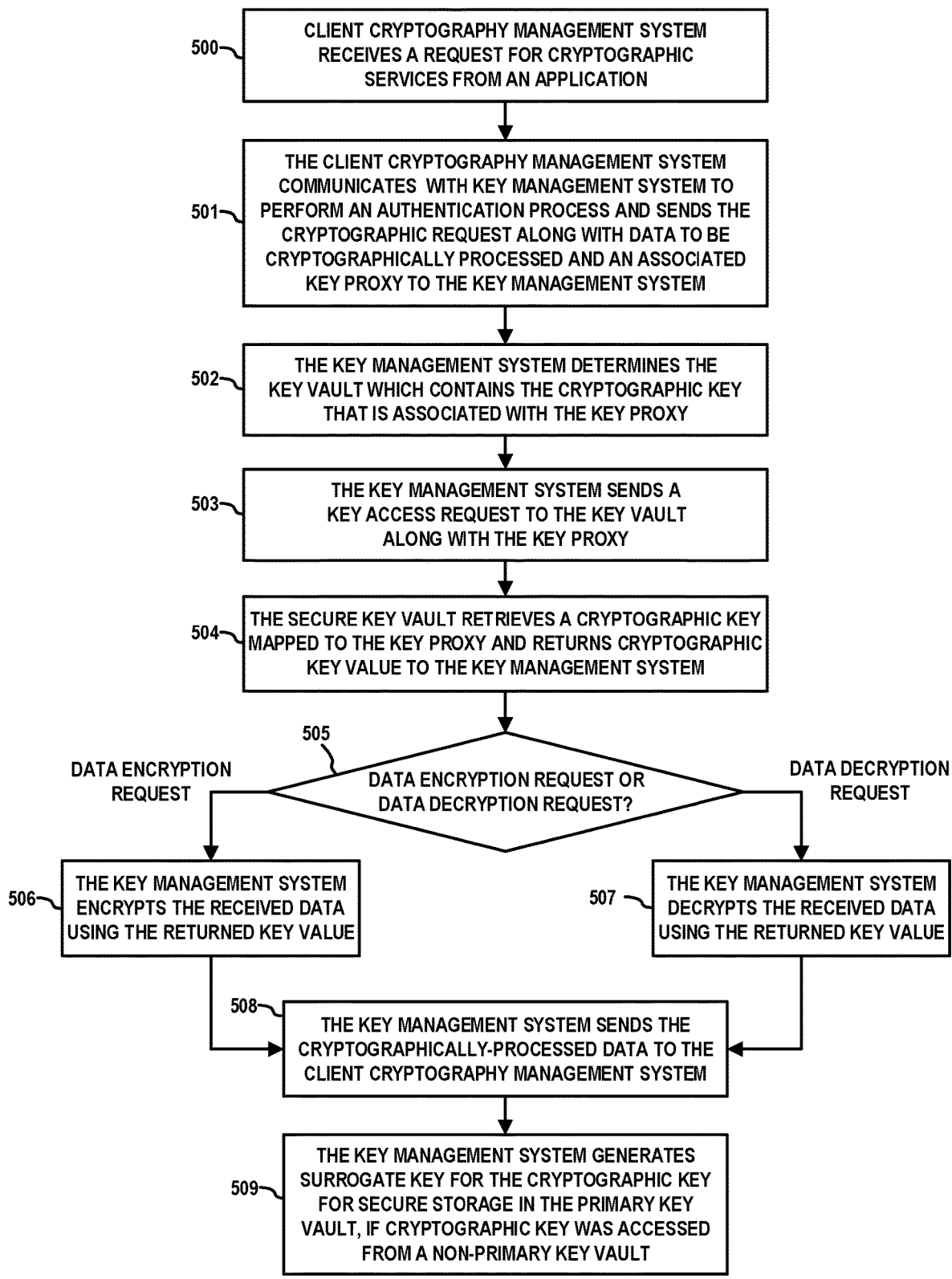
FIG. 5 is a flow diagram of a method for cryptographically processing data using key proxies and surrogate keys, according to an exemplary embodiment of the disclosure.

FIG. 5 is a flow diagram of a method for cryptographically processing data using key proxies and surrogate keys, according to an exemplary embodiment of the disclosure. For illustrative purposes, the process flow of FIG. 5 will be discussed in conjunction with the exemplary embodiments of FIGS. 1 and 2. Referring to FIG. 5, a client cryptography management system (e.g., system 114, FIG. 1) receives a cryptographic request for cryptographic services from a given application executing on, e.g., a client device or application server (block 500). For example, the given application may have accessed encrypted data from a storage system (e.g., the local data storage system 130, FIG. 1) and needs to have the data decrypted. In this instance, the cryptographic request comprises a data decryption request which includes the encrypted data and the key proxy associated with the application. By way of further example, the given application may have data which the application wants to have encrypted and stored in a data storage system (e.g., the local data storage system 130, FIG. 1) in encrypted form. In this instance, the cryptographic request comprises a data encryption request which includes the data to be encrypted and the key proxy associated with the application.

In response to the cryptographic request received from the application, the cryptography management system 114 communicates with a key management system 120 to perform an authentication process and sends the cryptographic request along with the data (e.g., encrypted data or plaintext data) to be cryptographically processed and the associated key proxy to the key management system 120 (block 501). For example, in some embodiments, the authentication process is performed to authenticate credentials of the requesting application, the client cryptography management system 114, and/or the key management system 120, using the same or similar authentication methods as discussed above. In response to verification of the credentials, a secure communications channel is established between the client cryptography management system 114 and the key management system 120. The client cryptography management system 114 sends the cryptographic request along with the data (e.g., plaintext or encrypted data) to be cryptographically processed and the associated key proxy to the key management system 120 over the secure communications channel.

In response to receiving the cryptographic request, the key management system 120 proceeds to determine a key vault which contains the target cryptographic key that is associated with the key proxy (block 502). More specifically, in some embodiments, assuming the key management system 120 is currently managing a plurality of key vaults including the primary (default) key vault 140 and one or more additional key vaults, the key management system 120 utilizes key proxy-to-key mapping information to determine which key vault hosts the cryptographic key associated with the received key proxy information. On the other hand, if the key management system 120 is managing only the primary (default) key vault 140 (e.g., when all key vaults have been merged/consolidated into the key vault 140), the key management system 120 utilizes key proxy-to-key mapping information to confirm that the cryptographic key associated with the received key proxy information resides in the primary (default) key vault 140.

The key management system 120 sends a key access request along with the key proxy to the key vault which is determined to host the cryptographic key associated with the key proxy (block 503). The key vault 140 will retrieve a stored cryptographic key that is mapped to the key proxy, and return the cryptographic key value to the key management system 120 (block 504). In some embodiments, the key management system 120 sends the credentials used in the authentication process to the key vault as part of the key access request, wherein the key retrieval process will utilize the credentials to confirm that the key proxy is mapped to a client identifier associated with such credentials. The cryptographic key associated with the key proxy can be a regular cryptographic key or a surrogate key. As noted above, the key lookup operations for regular cryptographic keys and surrogate keys are different. When the key management system 120 looks up the key in the vault using the key proxy, the lookup will return the key value associated with a regular cryptographic key. When the search locates a surrogate key, the lookup operation returns the key value of the embedded key specified in the custom "embedded-key" attribute of the surrogate key.

The key management system 120 then proceeds with cryptographic processing of the received data utilizing the returned cryptographic key value, depending on whether the received request was a data encryption request or a data decryption request (decision block 505). If a data encryption request was received, the key management system 120 will encrypt the received data using the returned key value (block 506). On the other hand, if a data decryption request was received, the key management system 120 will decrypt the received data using the returned key value (block 507). In some embodiments, when the cryptographic key value is encrypted, the cryptographic processing comprises decrypting the cryptographic key value using an associated key decryption key.

The key management system 120 then proceeds to send the cryptographically-processed data (e.g., encrypted data or decrypted data) back to the client cryptography management system 114 as a response to the previously received cryptographic request (block 508). In turn, the client cryptography management system 114 returns the cryptographically-processed data to the client application as a response to the previously received cryptographic request. The application (e.g., client application or application server) can store the returned encrypted data in a local or remote data storage system (and possibly further encrypt the encrypted data to implement multi-layer encryption), or otherwise process the returned decrypted data as needed.

In some embodiments, when the key management system 120 determines (in block 502) that the target cryptographic key associated with the key proxy is hosted by a key vault other than the primary (default) key vault, the key management system 120 can proceed to generate a surrogate key for the target cryptographic key in the primary key vault to thereby import the cryptographic key into the primary key vault (block 509). In some embodiments, a surrogate key is generated using the process of FIG. 4, as discussed above.

Figure 6:
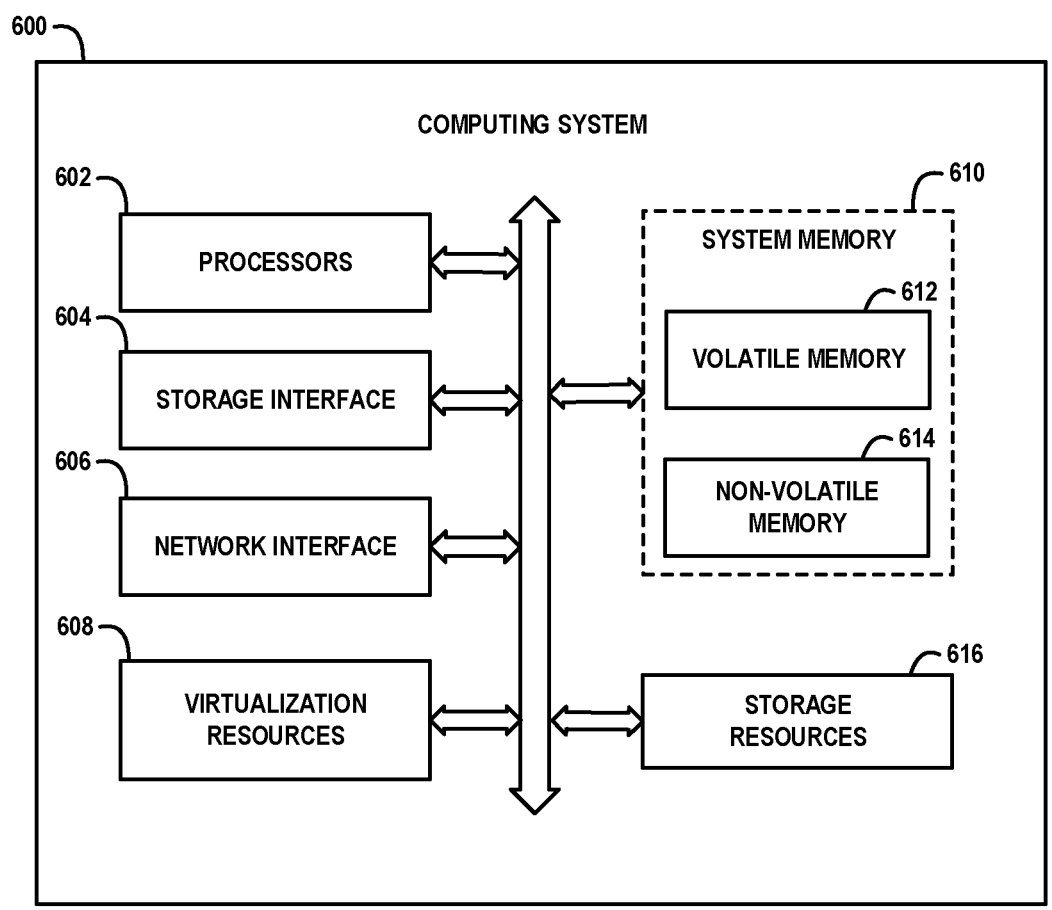
FIG. 6 schematically illustrates framework of a computing system which can be implemented for hosting a cryptographic key management system according to an exemplary embodiment of the disclosure.

FIG. 6 schematically illustrates framework of a computing system 600 which can be implemented for hosting a cryptographic key management system according to an exemplary embodiment of the disclosure. More specifically, in some embodiments, FIG. 6 illustrates an exemplary framework of: (i) the client computing system 110 of FIG. 1 which hosts a cryptography management system 114; (ii) the application server 240 of FIG. 2 which hosts a cryptography management system 114; and/or (iii) the key management server 250 of FIG. 2 which hosts the key management system 120. The computing system 600 comprises processors 602, storage interface circuitry 604, network interface circuitry 606, virtualization resources 608, system memory 610, and storage resources 616. The system memory 610 comprises volatile memory 612 and non-volatile memory 614.

The processors 602 comprise one or more types of hardware processors that are configured to process program instructions and data to execute a native operating system (OS) and applications that run on the computing system 600. For example, the processors 602 may comprise one or more CPUs, microprocessors, microcontrollers, application specific integrated circuits (ASICs), field programmable gate arrays (FPGAs), and other types of processors, as well as portions or combinations of such processors. The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, graphics processing units (GPUs), digital signal processors (DSPs), system-on-chip (SoC), tensor processing units (TPUs), image processing units (IPUs), deep learning accelerators (DLAs), artificial intelligent (AI) accelerators, and other types of specialized processors or coprocessors that are configured to execute one or more fixed functions.

The storage interface circuitry 604 enables the processors 602 to interface and communicate with the system memory 610, the storage resources 616, and other local storage and off-infrastructure storage media, using one or more standard communication and/or storage control protocols to read data from or write data to volatile and non-volatile memory/storage devices. Such protocols include, but are not limited to, non-volatile memory express (NVMe), peripheral component interconnect express (PCIe), Parallel ATA (PATA), Serial ATA (SATA), Serial Attached SCSI (SAS), Fibre Channel, etc. The network interface circuitry 606 enables the computing system 600 to interface and communicate with a network and other system components. The network interface circuitry 606 comprises network controllers such as network cards and resources (e.g., network interface controllers (NICs) (e.g., SmartNICs, RDMA-enabled NICs), Host Bus Adapter (HBA) cards, Host Channel Adapter (HCA) cards, I/O adaptors, converged Ethernet adaptors, etc.) to support communication protocols and interfaces including, but not limited to, PCIe, DMA and RDMA data transfer protocols, etc.

The virtualization resources 608 can be instantiated to execute one or more applications or functions which are hosted by the computing system 600. For example, the virtualization resources 608 can be configured to implement various modules and functionalities of a cryptography management system 114 or key management system 120 as discussed herein. In one embodiment, the virtualization resources 608 comprise virtual machines that are implemented using a hypervisor platform which executes on the computing system 600, wherein one or more virtual machines can be instantiated to execute functions of the computing system 600. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer.

A hypervisor is an example of what is more generally referred to as "virtualization infrastructure." The hypervisor runs on physical infrastructure, e.g., CPUs and/or storage devices, of the computing system 600, and emulates the CPUs, memory, hard disk, network and other hardware resources of the host system, enabling multiple virtual machines to share the resources. The hypervisor can emulate multiple virtual hardware platforms that are isolated from each other, allowing virtual machines to run, e.g., Linux and Windows Server operating systems on the same underlying physical host. An example of a commercially available hypervisor platform that may be used to implement one or more of the virtual machines in one or more embodiments of the disclosure is the VMware® vSphere™ which may have an associated virtual infrastructure management system such as the VMware® vCenter™. The underlying physical infrastructure may comprise one or more commercially available distributed processing platforms which are suitable for the target application.

In another embodiment, the virtualization resources 608 comprise containers such as Docker containers or other types of Linux containers (LXCs). As is known in the art, in a container-based application framework, each application container comprises a separate application and associated dependencies and other components to provide a complete filesystem, but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute one or more applications or functions of the computing system 600 as well as various modules and functionalities of a cryptography management system 114 or key management system 120 as discussed herein. In yet another embodiment, containers may be used in combination with other virtualization infrastructure such as virtual machines implemented using a hypervisor, wherein Docker containers or other types of LXCs are configured to run on virtual machines in a multi-tenant environment.

In one embodiment, the various modules of the cryptography management system 114 and the key management system 120 as shown in FIG. 1 comprise program code that is loaded into the system memory 610 (e.g., volatile memory 612), and executed by the processors 602 to perform respective functions as described herein. In this regard, the system memory 610, the storage resources 616, and other memory or storage resources as described herein, which have program code and data tangibly embodied thereon, are examples of what is more generally referred to herein as "processor-readable storage media" that store executable program code of one or more software programs. Articles of manufacture comprising such processor-readable storage media are considered embodiments of the disclosure. An article of manufacture may comprise, for example, a storage device such as a storage disk, a storage array or an integrated circuit containing memory. The term "article of manufacture" as used herein should be understood to exclude transitory, propagating signals.

The system memory 610 comprises various types of memory such as volatile RAM, NVRAM, or other types of memory, in any combination. The volatile memory 612 may be a dynamic random-access memory (DRAM) (e.g., DRAM DIMM (Dual In-line Memory Module), or other forms of volatile RAM. The non-volatile memory 614 may comprise one or more of a NAND Flash storage device, an SSD device, or other types of next generation non-volatile memory (NGNVM) devices. The system memory 610 can be implemented using a hierarchical memory tier structure wherein the volatile system memory 612 is configured as the highest-level memory tier, and the non-volatile system memory 614 (and other additional non-volatile memory devices which comprise storage-class memory) is configured as a lower level memory tier which is utilized as a high-speed load/store non-volatile memory device on a processor memory bus (i.e., data is accessed with loads and stores, instead of with I/O reads and writes). The term "memory" or "system memory" as used herein refers to volatile and/or non-volatile memory which is utilized to store application program instructions that are read and processed by the processors 602 to execute a native operating system and one or more applications or processes hosted by the computing system 600, and to temporarily store data that is utilized and/or generated by the native OS and application programs and processes running on the computing system 600. The storage resources 616 can include one or more HDDs, SSD storage devices, etc.

It is to be understood that the above-described embodiments of the disclosure are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of such embodiments. Numerous other alternative embodiments within the scope of the appended claims will be readily apparent to those skilled in the art.

What is claimed is:

1. A method, comprising:
obtaining, by a key management system, a cryptographic key from a first key vault, wherein the cryptographic key comprises a key value and attributes which describe the cryptographic key; and
importing, by the key management system, the cryptographic key into a second key vault by generating and storing a surrogate key in the second key vault which corresponds to the imported cryptographic key;
wherein generating the surrogate key comprises:
creating a new cryptographic key in the second key vault using an application programming interface (API) of the second key vault, the new cryptographic key comprising attributes specified by the API;
designating the new cryptographic key as the surrogate key; and
setting a value of at least one attribute of the surrogate key to a value of a corresponding attribute of the imported cryptographic key;
wherein the surrogate key comprises a key attribute which is set to a value which corresponds to the key value of the imported cryptographic key.

2. The method of claim 1, wherein
setting the value of at least one attribute of the surrogate key comprises setting values of the attributes of the surrogate key equal to values of corresponding attributes of the imported cryptographic key.

3. The method of claim 1, wherein the key attribute of the surrogate key comprises a custom attribute which is created using the API of the second key vault.

4. The method of claim 1, further comprising setting a value of a key proxy attribute of the surrogate key equal to a value of a key proxy attribute of the imported cryptographic key.

5. The method of claim 1, wherein the value of the key attribute is set equal to the key value of the imported cryptographic key.

6. The method of claim 1, further comprising:
encrypting the key value of the imported cryptographic key; and
setting the value of the key attribute equal to the encrypted key value of the imported cryptographic key.

7. The method of claim 1, wherein obtaining the cryptographic key from the first key vault, comprises:
receiving, by the key management system, a cryptographic request from a client application, wherein the cryptographic request comprises a key proxy assigned to the client application and at least one of encrypted data and plaintext data;
determining, by the key management system, which key vault, among a plurality of key vaults comprising at least the first key vault and the second key vault, hosts a cryptographic key associated with the received key proxy;
obtaining, by the key management system, the cryptographic key from the first key vault in response to determining that the first vault hosts the cryptographic key which corresponds to the received key proxy; and
utilizing, by the key management system, the key value of the cryptographic key to one of (i) encrypt the received plaintext data, and (ii) decrypt the received encrypted data.

8. The method of claim 1, wherein obtaining the cryptographic key from the first key vault is performed as part of a vault merging process performed by the key management system to consolidate the first and second vaults by importing cryptographic keys in the first vault into the second vault.

9. An article of manufacture comprising a non-transitory processor-readable storage medium having stored therein program code of one or more software programs, wherein the program code is executable by one or more processors to implement a method comprising:
obtaining, by a key management system, a cryptographic key from a first key vault, wherein the cryptographic key comprises a key value and attributes which describe the cryptographic key; and
importing, by the key management system, the cryptographic key into a second key vault by generating and storing a surrogate key in the second key vault which corresponds to the imported cryptographic key;
wherein generating the surrogate key comprises:
creating a new cryptographic key in the second key vault using an application programming interface (API) of the second key vault, the new cryptographic key comprising attributes specified by the API;
designating the new cryptographic key as the surrogate key; and
setting a value of at least one attribute of the surrogate key to a value of a corresponding attribute of the imported cryptographic key;
wherein the surrogate key comprises a key attribute which is set to a value which corresponds to the key value of the imported cryptographic key.

10. The article of manufacture of claim 9, wherein
setting the value of at least one attribute of the surrogate key comprises setting values of the attributes of the surrogate key equal to values of corresponding attributes of the imported cryptographic key.

11. The article of manufacture of claim 9, wherein the key attribute of the surrogate key comprises a custom attribute which is created using the API of the second key vault.

12. The article of manufacture of claim 9, further comprising program code that is executable by the one or more processors to perform a method which comprises setting a value of a key proxy attribute of the surrogate key equal to a value of a key proxy attribute of the imported cryptographic key.

13. The article of manufacture of claim 9, wherein the value of the key attribute is set equal to the key value of the imported cryptographic key.

14. The article of manufacture of claim 9, further comprising program code that is executable by the one or more processors to perform a method which comprises:
encrypting the key value of the imported cryptographic key; and
setting the value of the key attribute equal to the encrypted key value of the imported cryptographic key.

15. A system, comprising:
at least one processor; and
a system memory configured to store program code, wherein the program code is executable by the at least one processor to instantiate a key management system, wherein the key management system is configured to:
obtain a cryptographic key from a first key vault, wherein the cryptographic key comprises a key value and attributes which describe the cryptographic key; and
import the cryptographic key into a second key vault by generating and storing a surrogate key in the second key vault which corresponds to the imported cryptographic key;
wherein in generating the surrogate key, the key management system is configured to:
create a new cryptographic key in the second key vault using an application programming interface (API) of the second key vault, the new cryptographic key comprising attributes specified by the API;
designate the new cryptographic key as the surrogate key; and
set a value of at least one attribute of the surrogate key to a value of a corresponding attribute of the imported cryptographic key;
wherein the surrogate key comprises a key attribute which is set to a value which corresponds to the key value of the imported cryptographic key.

16. The system of claim 15, wherein in setting the value of at least one attribute of the surrogate key, the key management system is configured to:
set values of the attributes of the surrogate key equal to values of corresponding attributes of the imported cryptographic key.

17. The system of claim 15, wherein the key attribute of the surrogate key comprises a custom attribute which is created using the API of the second key vault.

18. The system of claim 15, wherein the key management system is further configured to set a value of a key proxy attribute of the surrogate key equal to a value of a key proxy attribute of the imported cryptographic key.

19. The system of claim 15, wherein the key management system is configured to set the value of the key attribute equal to the key value of the imported cryptographic key.

20. The system of claim 15, wherein the key management system is configured to:
  encrypt the key value of the imported cryptographic key; and
  set the value of the key attribute equal to the encrypted key value of the imported cryptographic key.

* * * * *